(12) United States Patent
Mikawa

(10) Patent No.: US 10,091,472 B2
(45) Date of Patent: Oct. 2, 2018

(54) IMAGE GENERATING UNIT AND IMAGE PROJECTING APPARATUS

(71) Applicant: Akihisa Mikawa, Kanagawa (JP)

(72) Inventor: Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/443,115

(22) Filed: Feb. 27, 2017

(65) Prior Publication Data

US 2017/0272711 A1 Sep. 21, 2017

(30) Foreign Application Priority Data

Mar. 15, 2016 (JP) ................. 2016-051335
Apr. 18, 2016 (JP) ................. 2016-082977

(51) Int. Cl.
*H04N 9/31* (2006.01)
*G02B 26/08* (2006.01)

(52) U.S. Cl.
CPC ......... *H04N 9/3144* (2013.01); *G02B 26/085* (2013.01); *H04N 9/312* (2013.01)

(58) Field of Classification Search
CPC ............. G02B 26/0833; G02B 26/085; H04N 9/3141; H04N 9/3144; H04N 9/312; H04N 9/3102; G03B 21/008; G03B 21/142; G03B 21/2066; G03B 21/28; G03B 21/14

See application file for complete search history.

(56) References Cited

U.S. PATENT DOCUMENTS

| | | | |
|---|---|---|---|
| 7,389,519 B2 | 6/2008 | Yamanaka et al. | |
| 7,639,933 B2 | 12/2009 | Seo et al. | |
| 8,167,433 B2 | 5/2012 | He | |
| 8,446,672 B2 | 5/2013 | Omi | |
| 9,213,223 B2 | 12/2015 | Mashitani | |
| 9,253,431 B2 | 2/2016 | Tani et al. | |
| 9,354,494 B2 | 5/2016 | Mashitani et al. | |
| 2011/0019157 A1* | 1/2011 | He | G02B 7/005 353/33 |
| 2015/0268538 A1* | 9/2015 | Gyoten | G03B 21/142 353/22 |
| 2016/0154294 A1 | 6/2016 | Fujioka et al. | |
| 2016/0198134 A1 | 7/2016 | Mikawa et al. | |

FOREIGN PATENT DOCUMENTS

| | | |
|---|---|---|
| JP | 2001-350196 | 12/2001 |
| JP | 2004-180011 | 6/2004 |
| JP | 2008-070494 | 3/2008 |
| JP | 2008-292647 | 12/2008 |
| JP | 2011-027821 | 2/2011 |
| JP | 2012-181386 | 9/2012 |
| JP | 5084308 | 11/2012 |
| JP | 2013-117629 | 6/2013 |
| JP | 5365314 | 12/2013 |

(Continued)

*Primary Examiner* — Christina Riddle
*Assistant Examiner* — Christopher Lamb, II
(74) *Attorney, Agent, or Firm* — IPUSA, PLLC

(57) ABSTRACT

An image generating unit includes a fixed member on which one of a driving magnet and a coil is provided; a heat radiating part on which the other of the driving magnet and the coil is provided; and an image generating part, to which the heat radiating part is attached, configured to receive illumination light to generate an image.

7 Claims, 14 Drawing Sheets

(56) References Cited

FOREIGN PATENT DOCUMENTS

| | | |
|---|---|---|
| JP | 2015-194721 | 11/2015 |
| JP | 2016-085363 | 5/2016 |
| JP | 2016-102945 | 6/2016 |
| JP | 2016-102946 | 6/2016 |
| WO | 2016067519 | 5/2016 |

* cited by examiner

IMAGE GENERATING UNIT AND IMAGE PROJECTING APPARATUS

CROSS-REFERENCE TO RELATED APPLICATIONS

The present application claims priority under 35 U.S.C. § 119 to Japanese Patent Application No. 2016-051335 filed on Mar. 15, 2016, and Japanese Patent Application No. 2016-082977 filed on Apr. 18, 2016, the contents of which are incorporated herein by reference in their entirety.

BACKGROUND OF THE INVENTION

1. Field of the Invention

The disclosures herein generally relate to an image generating unit and an image projecting apparatus.

2. Description of the Related Art

An image projecting apparatus, which projects, on a screen or the like, an image generated based on image data received from a personal computer (PC) or the like, for example, is known in the related art.

In such an image projecting apparatus, for example, a method is known for shifting optical axes with respect to light beams emitted from a plurality of pixels of a display element to shift the pixels so as to display an image with higher resolution than that of the display element (refer to, for example, Japanese Unexamined Patent Application Publication No. 2004-180011).

When the pixels are shifted to enhance the resolution of the image as the image projecting apparatus according to Japanese Unexamined Patent Application Publication No. 2004-180011, it is required to shift, at high speed, the pixels by a minute distance less than a pixel pitch of the display element. Because pixels and density of the display element, used for the image projecting apparatus, have been enhanced, it is required to shift the projection image accurately and stably in order to further enhance the resolution of the image by shifting the pixels.

SUMMARY OF THE INVENTION

It is a general object of at least one embodiment of the present disclosure to provide an image generating unit and an image projecting apparatus that substantially obviate one or more problems caused by the limitations and disadvantages of the related art.

According to one aspect of the present disclosure, there is provided an image generating unit including a fixed member on which one of a driving magnet and a coil is provided; a heat radiating part on which the other of the driving magnet and the coil is provided; and an image generating part, to which the heat radiating part is attached, configured to receive illumination light to generate an image.

DESCRIPTION OF THE PREFERRED EMBODIMENTS

Figure 1:
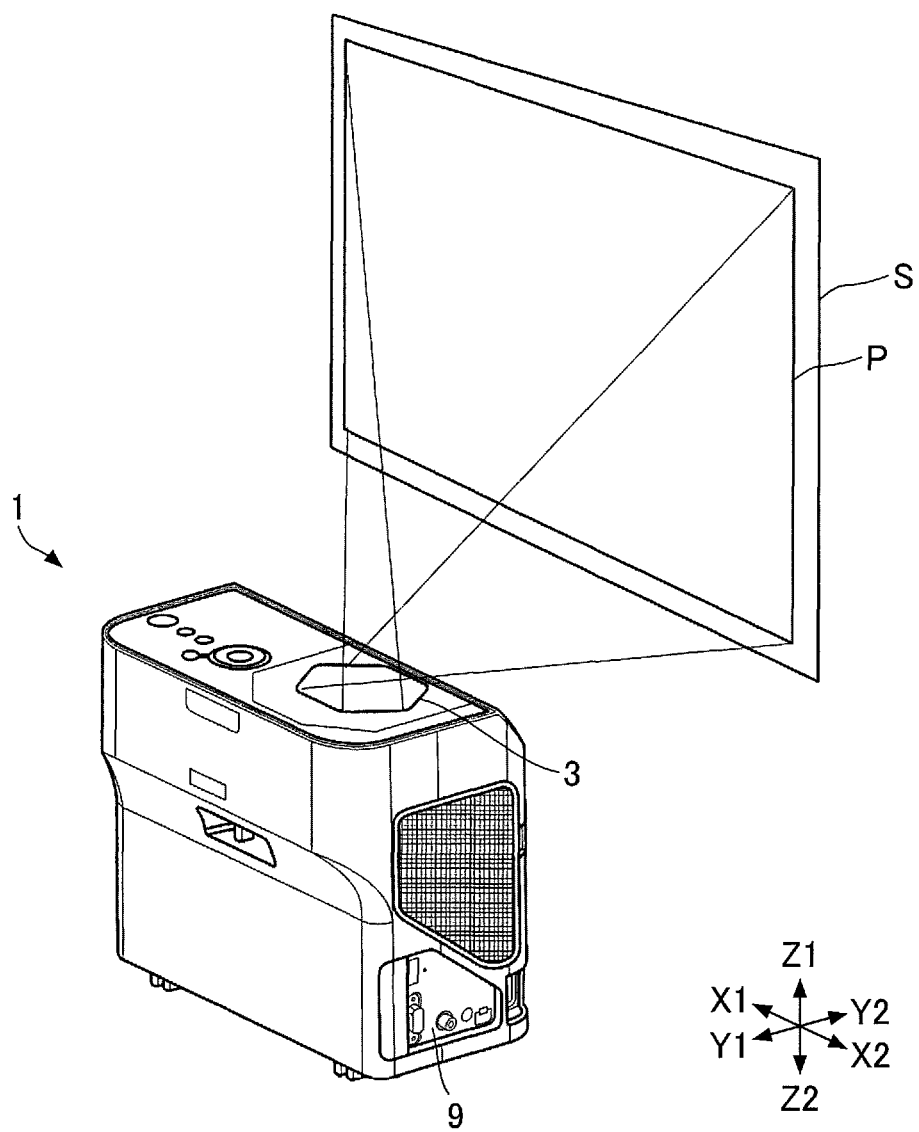
FIG. 1 is a perspective view of an example of an image projecting apparatus according to an embodiment.

In the following, an embodiment of the present disclosure will be described with reference to the accompanying drawings. In the drawings, the same numerals are given to the same elements and overlapping descriptions may be omitted as appropriate. The present disclosure has an object to provide an image generating unit that can enhance accuracy and stability of shift operation of a projection image.

FIG. 1 is a diagram illustrating a projector 1 according to an embodiment.

The projector 1 is an example of an image projecting apparatus. The projector 1 includes a radiation window 3 and an external interface (I/F) 9, and an optical engine, which is configured to generate a projection image, is provided inside of the projector 1. For example, when image data is transmitted to the projector 1 from a personal computer (PC) or a digital camera coupled to the external interface 9, the optical engine generates an image based on the received image data and projects the image P from the radiation window 3 onto a screen S as illustrated in FIG. 1.

Note that, in the following drawings, X1-X2 directions represent width directions of the projector 1, Y1-Y2 directions represent height directions of the projector 1, and Z1-Z2 directions represent depth directions of the projector 1. Moreover, in the following description, it is assumed that the radiation window 3 side of the projector 1 corresponds to the top of the projector 1 and the side of the projector 1 opposite to the radiation window 3 corresponds to the bottom of the projector 1.

Figure 2:
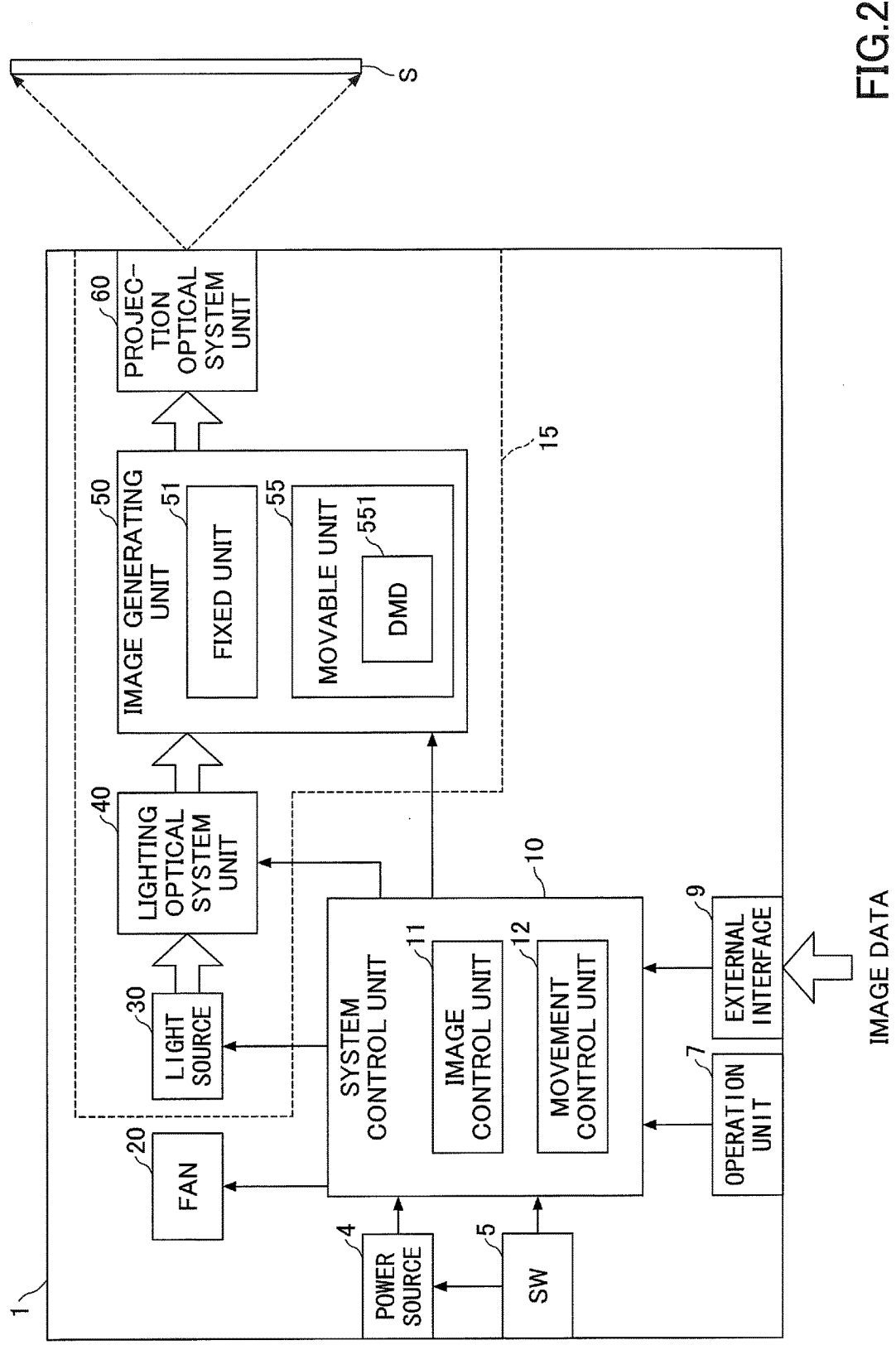
FIG. 2 is a block diagram illustrating an example of a configuration of the image projecting apparatus according to the embodiment.

FIG. 2 is a block diagram illustrating a configuration of the projector 1.

As illustrated in FIG. 2, the projector 1 includes a power source 4, a main switch (SW) 5, an operation unit 7, an external interface (I/F) 9, a system control unit 10, a fan 20, and an optical engine 15.

The power source 4 is coupled to a commercial power source, converts voltage and frequency of the commercial power for the internal circuits of the projector 1, and supplies the power to each of the system control unit 10, the fan 20, and the optical engine 15.

The main switch 5 is switched ON or OFF by a user to power on or off the projector 1.

While the power source 4 is coupled to the commercial power source via a power cord, if the main switch 5 is switched ON, the power source 4 starts supplying power to the respective components of the projector 1, and if the main switch 5 is switched OFF, the power source 4 stops to supply the power to the respective components of the projector 1.

The operation unit 7 includes buttons configured to receive various input operations by a user. For example, the operation unit 7 is provided on a top surface of the projector 1. The operation unit 7 is configured to receive input operations by the user, such as selection of a size of a projection image, selection of a color tone, and adjustment of a focus. The user's input operation received by the operation unit 7 is sent to the system control unit 10.

The external interface 9 includes connection terminals coupled to, for example, a personal computer (PC) or a digital camera, and is configured to supply (output) image data, which is received from the coupled apparatus, to the system control unit 10.

The system control unit 10 includes an image control unit 11 and a drive control unit 12. For example, the system control unit 10 may include a CPU (a processor), a ROM, and a RAM as hardware components thereof. The functions of the system control unit 10 may be implemented by instructions from the CPU when at least one program read from the ROM into the RAM is executed by the CPU.

The image control unit 11 is configured to control a digital micromirror device (DMD) 551 provided in an image generating unit 50 of the optical engine 15 based on the image data received from the external interface 9, to generate an image to be projected on the screen S.

The drive control unit 12 is configured to move a movable unit 55 (which is provided to be movable in the image generating unit 50) and control a position of the DMD 551 provided in the movable unit 55.

The fan 20 is rotated under the control of the system control unit 10 to cool a light source 30 of the optical engine 15.

The optical engine 15 includes the light source 30, a lighting optical system unit 40, the image generating unit 50, and a projection optical system unit 60. The optical engine 15 is controlled by the system control unit 10 to project an image on a screen S as illustrated in FIG. 1.

Examples of the light source 30 include a mercury high-pressure lamp, a xenon lamp, and a light emitting diode (LED). The light source 30 is controlled by the system control unit 10 to emit illumination light to the DMD 551 provided on the image generating unit 50 via the lighting optical system unit 40.

The lighting optical system unit 40 includes, for example, a color wheel, a light tunnel, and relay lenses. The lighting optical system unit is configured to guide the illumination light emitted from the light source 30 to the DMD 551 provided in the image generating unit 50.

The image generating unit 50 includes a fixed unit 51, which is fixed and supported on the image generating unit 50, and the movable unit 55, which is supported to be movable relative to the fixed unit 51. The movable unit 55 includes the DMD 551 and a position of the movable unit 55 relative to the fixed unit 51 is controlled by the drive control unit 12 of the system control unit 10. The DMD 551 is an example of an image generating part. The DMD 551 is controlled by the image control unit 11 of the system control unit 10. The DMD 551 is configured to modulate the illumination light received from the lighting optical system unit 40 and generate a projection image based on the received light.

The projection optical system unit 60 is an example of a projecting part. The projection optical system unit 60 includes, for example, a plurality of projection lenses and a mirror. The projection optical system unit 60 is configured to enlarge the image generated by the DMD 551 of the image generating unit 50, and project the enlarged image on the screen S.

Next, a configuration of the optical engine 15 of the projector 1 is explained.

Figure 3:
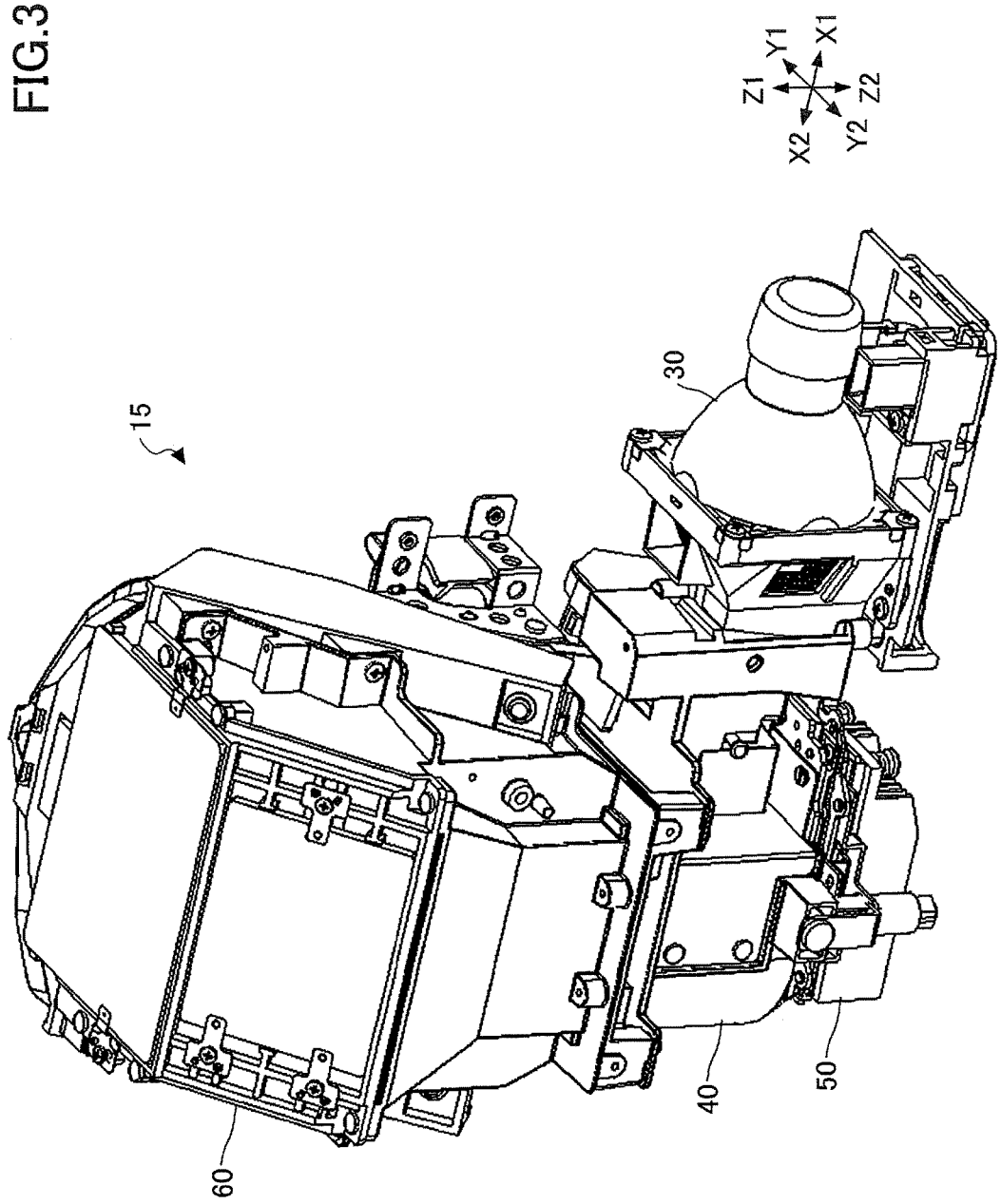
FIG. 3 is a perspective view of an optical engine according to the embodiment.

FIG. 3 is a perspective view of the optical engine 15 of the projector 1. As illustrated in FIG. 3, the optical engine 15 includes the light source 30, the lighting optical system unit 40, the image generating unit 50, and the projection optical system unit 60. The optical engine 15 is provided inside of the projector 1.

The light source 30 is provided on a side surface of the lighting optical system unit 40. The light source 30 is configured to emit light in the X2 direction. The lighting optical system unit 40 is configured to guide the light emitted from the light source 30 to the image generating unit 50. The image generating unit 50 is provided beneath the lighting optical system unit 40. The image generating unit 50 is configured to generate a projection image based on the light received from the lighting optical system unit 40. The projection optical system unit 60 is provided above the lighting optical system unit 40. The projection optical system unit 60 is configured to project the projection image generated by the image generating unit 50 onto the screen S, which is provided outside the projector 1.

The optical engine 15 of this embodiment is configured to project the image based on the light emitted from the light source 30 in an upward direction. Alternatively, the optical engine 15 may be configured to project the image in a horizontal direction.

Figure 4:
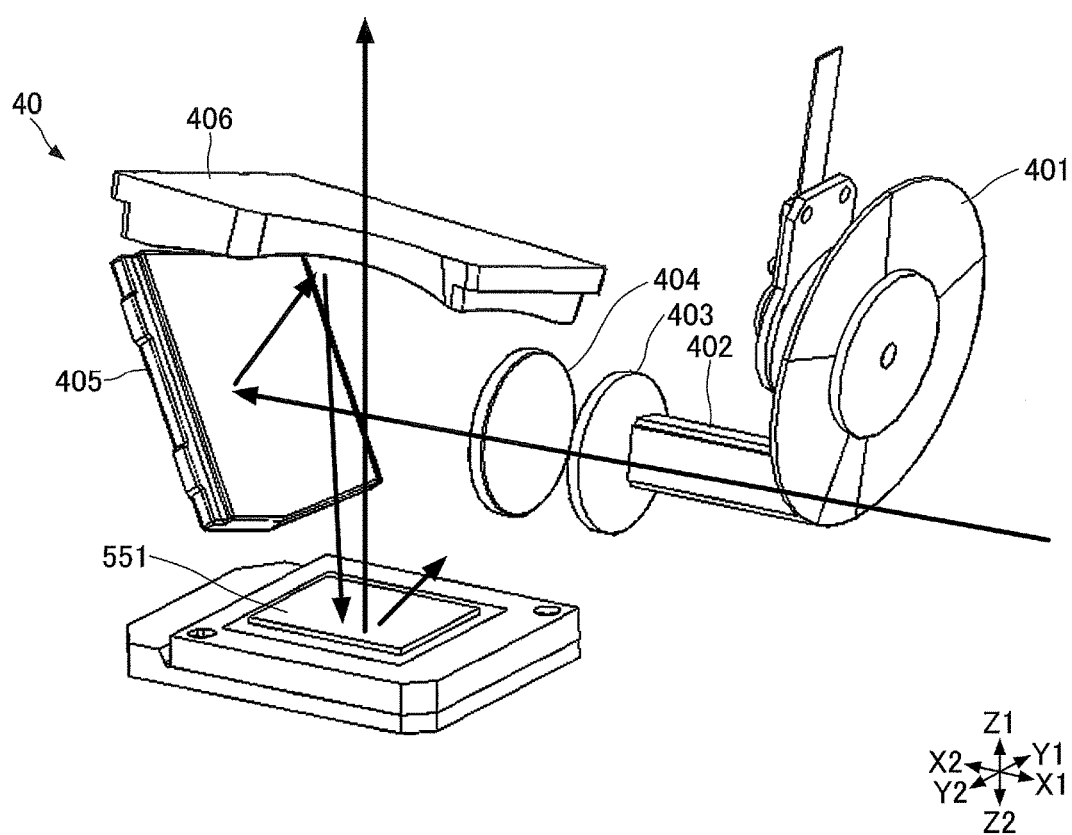
FIG. 4 is a perspective view of an example of a lighting optical system unit according to the embodiment.

FIG. 4 is a diagram illustrating the lighting optical system unit 40 according to the embodiment.

As illustrated in FIG. 4, the lighting optical system unit 40 includes a color wheel 401, a light tunnel 402, relay lenses 403 and 404, a cylinder mirror 405, and a concave mirror 406.

The color wheel 401 is, for example, a disc-like component, in which color filters of R (red), G (green), and B (blue) are provided at different portions in a circumferential direction thereof. The color wheel 401 is rotated at high speed so that the light emitted from the light source is divided into RGB color light beams in a time-division manner.

The light tunnel 402 is, for example, a rectangular tube-like component formed of bonded glass sheets. The light tunnel 402 functions to perform multipath reflection of the RGB color light beams passing through the color wheel 401 by the internal surfaces thereof for equalization of luminance distribution, and guides the light beams to the relay lenses 403 and 404.

The relay lenses 403 and 404 function to correct the chromatic aberrations on the optical axis of the light beams emitted from the light tunnel 402 and convert the light beams into converging light beams.

The cylinder mirror 405 and the concave mirror 406 function to reflect the light emitted from the relay lenses 403 and 404 to the DMD 551 provided in the image generating unit 50. The DMD 551 is configured to modulate the light reflected from the concave mirror 406 and generate a projection image.

Figure 5:
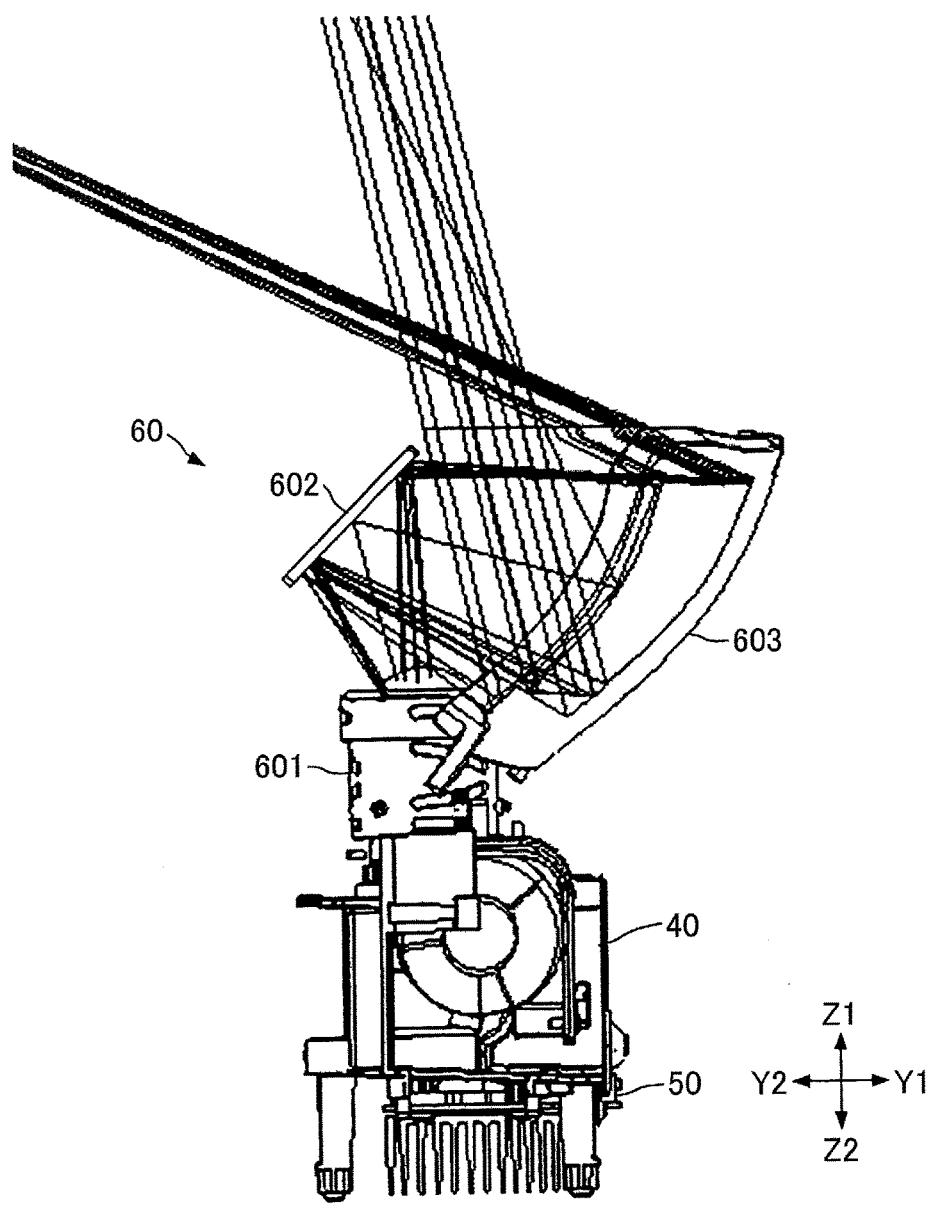
FIG. 5 is a diagram illustrating an example of an internal configuration of a projection optical system unit according to the embodiment.

FIG. 5 is a diagram illustrating an internal configuration of the projection optical system unit 60 according to the embodiment.

As illustrated in FIG. 5, the projection optical system unit 60 includes projection lenses 601, a folding mirror 602, and a curved surface mirror 603, which are provided in a housing of the projection optical system unit 60.

The projection lenses 601 include a plurality of lenses. The projection lenses 601 function to focus the projection image generated by the DMD 551 of the image generating unit 50 onto the folding mirror 602. The folding mirror 602 and the curved surface mirror 603 function to reflect the focused projection image so as to be enlarged, and project the image on the screen S, which is provided outside the projector 1.

Figure 6:
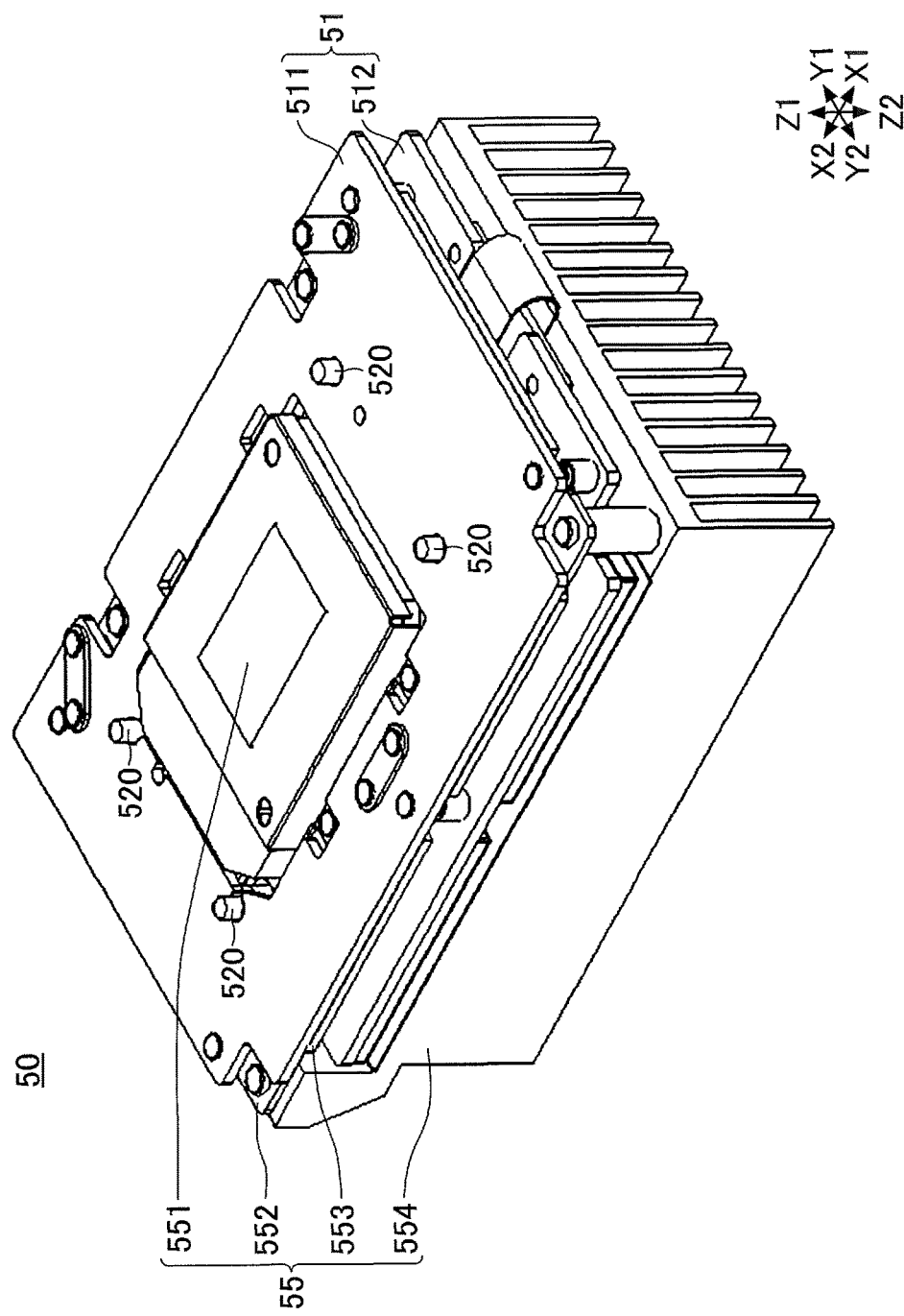
FIG. 6 is a perspective view of an image generating unit according to the embodiment.
Figure 7:
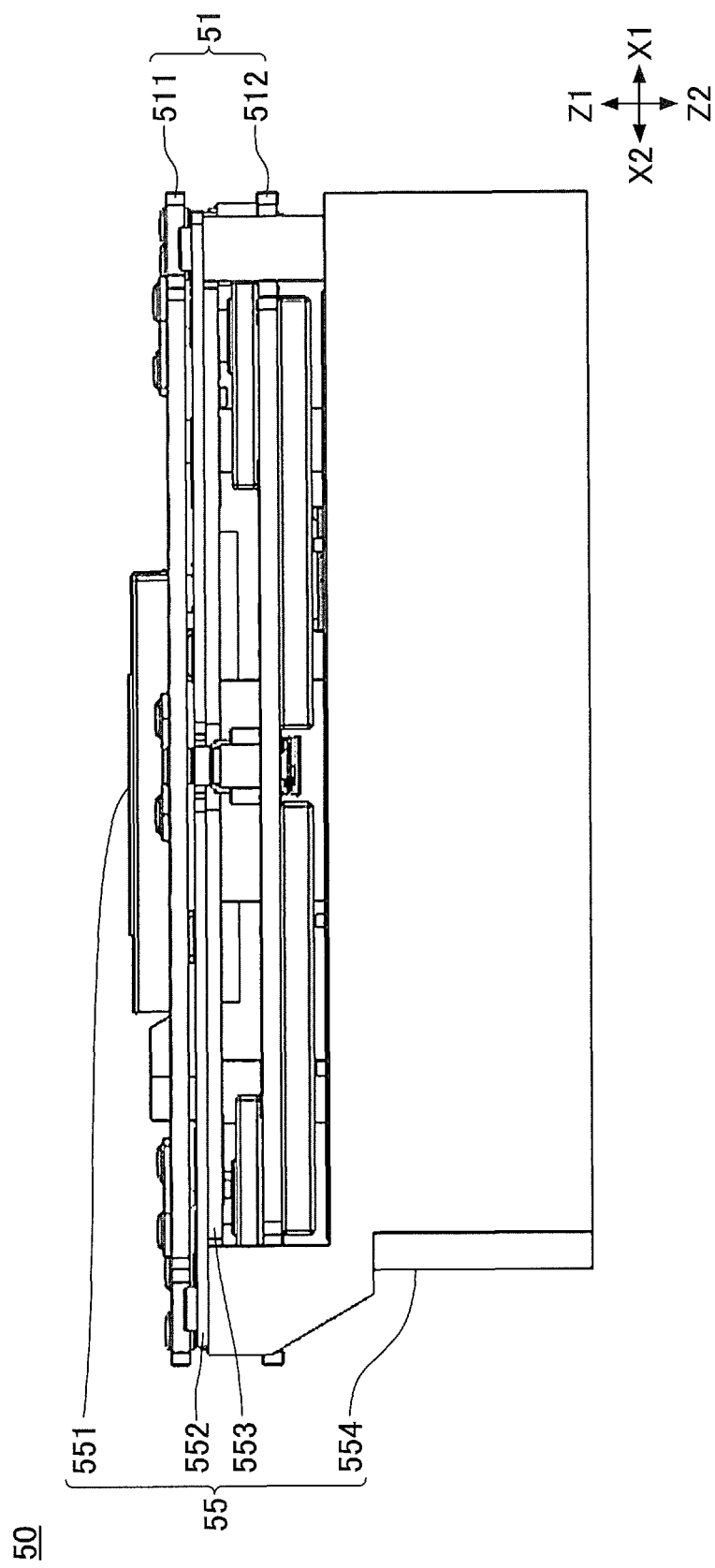
FIG. 7 is a side view of the image generating unit according to the embodiment.

FIG. 6 is a perspective view of the image generating unit 50 according to the embodiment. FIG. 7 is a side view of the image generating unit 50 according to the embodiment.

As illustrated in FIG. 6 and FIG. 7, the image generating unit 50 includes the fixed unit 51 and the movable unit 55. The fixed unit 51 is fixedly supported by the lighting optical system unit 40. The movable unit 55 is movably supported by the fixed unit 51.

The fixed unit 51 includes a top plate 511 as a first fixed plate, and a base plate 512 as a second fixed plate. The top plate 511 and the base plate 512 are held in parallel and face each other via a predetermined gap between the top plate 511 and the base plate 512. The fixed unit 51 is fixed to the bottom of the lighting optical system unit 40 with four screws 520 illustrated in FIG. 6.

The movable unit 55 includes the DMD 551, a movable plate 552 as a first movable plate, a DMD base plate 553 as a second movable plate, and a heat sink 554 as a heat radiating member. The movable unit 55 is supported by the fixed unit 51 so that the movable unit 55 is movable.

The DMD 551 is provided on the top surface of the DMD base plate 553. The DMD 551 has an image generation surface, in which a plurality of movable micromirrors are arrayed in a lattice formation. A specular surface of each of the micromirrors of the DMD 551 is provided to be tiltable (slantingly rotatable) around a torsion axis. The ON/OFF drive of each of the micromirrors of the DMD 551 is performed based on an image signal transmitted from the image control unit 11 of the system control unit 10. Here, the DMD 551, which is an example of an image generating part and receives illumination light emitted from the light source 30 to generate an image, is provided on the DMD base plate 553, which is an example of a movable part. The projection optical system unit 60 projects the image generated by the DMD 551.

For example, in an ON state, an inclination angle of the micromirror is controlled so that the micromirror reflects the illumination light from the light source 30 to the projection optical system unit 60. In an OFF state, the inclination angle of the micromirror is controlled so that the micromirror reflects the illumination light from the light source 30 to an OFF light plate (which is not illustrated).

In this manner, in the DMD 551, the inclination angle of each of the micromirrors of the DMD 551 is controlled based on the image signal transmitted from the image control unit 11, and the illumination light emitted from the light source 30 and guided by the lighting optical system unit 40 is modulated and the projection image is generated. In other words, the micromirrors of the DMD 551 may modulate the illumination light based on the image signal.

The movable plate 552 is supported between the top plate 511 and the base plate 512 of the fixed unit 51. The movable plate 552 is provided to be movable in a direction parallel to the surface of the movable plate 552.

The DMD base plate 553 is provided between the top plate 511 and the base plate 512. The DMD base plate 553 is coupled to the bottom surface side of the movable plate 552. The DMD 551 is provided on the top surface of the DMD base plate 553. The DMD base plate 553 is displaced (moved) together with the movable plate 552 that is provided to be movable.

The heat sink 554 radiates (dissipates) heat generated in the DMD 551. The heat sink 554 prevents the temperature of the DMD 551 from rising to reduce occurrence of problems such as malfunction and failure, due to the temperature rise of the DMD 551. The heat sink 554 is provided to be moved together with the movable plate 552 and the DMD base plate 553 so that the heat sink 554 can always radiate the heat generated in the DMD 551.

(Fixed Unit 51)

Figure 8:
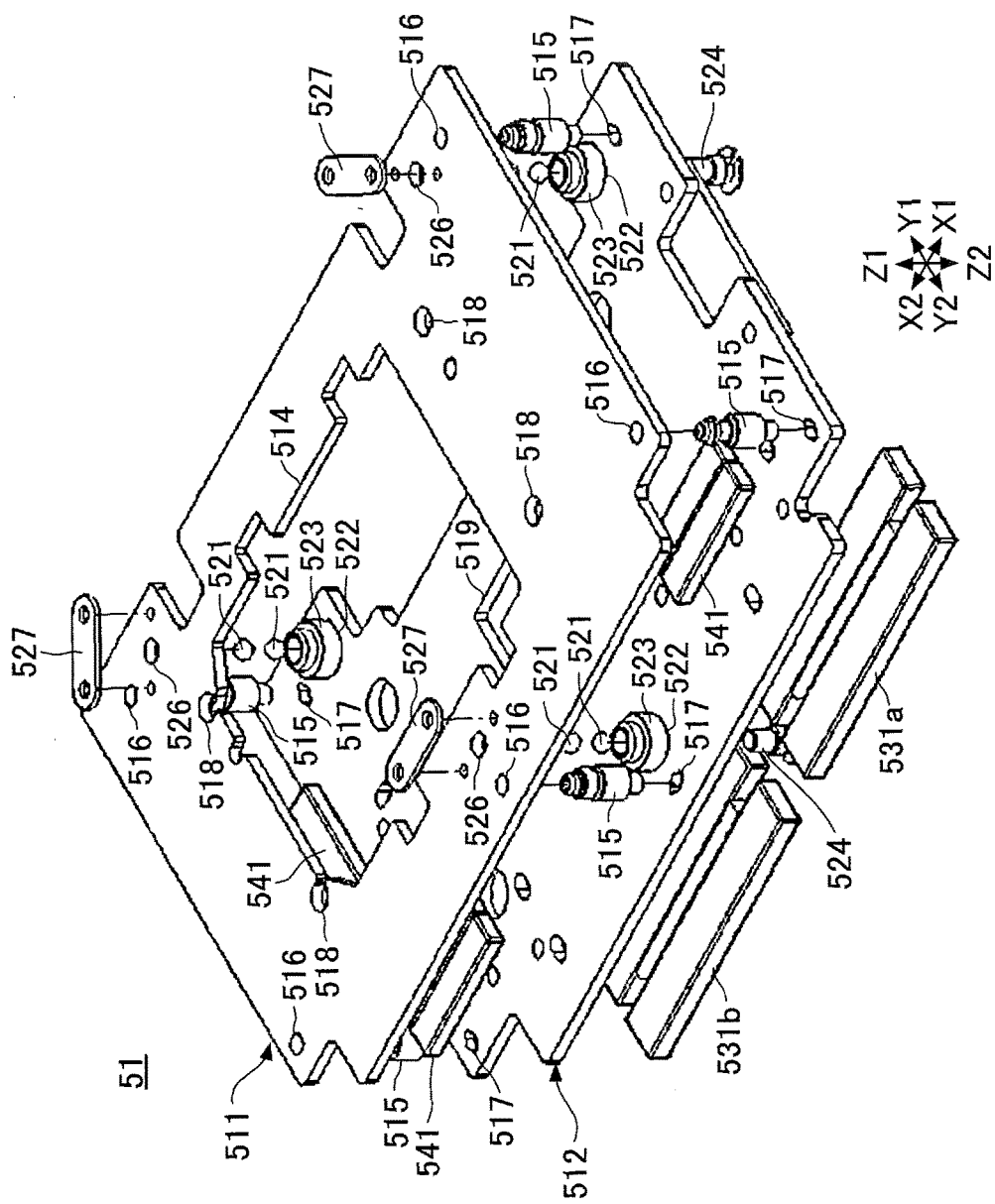
FIG. 8 is an exploded perspective view of a fixed unit according to the embodiment.

FIG. 8 is an exploded perspective view of the fixed unit 51 according to the embodiment.

Figure 9:
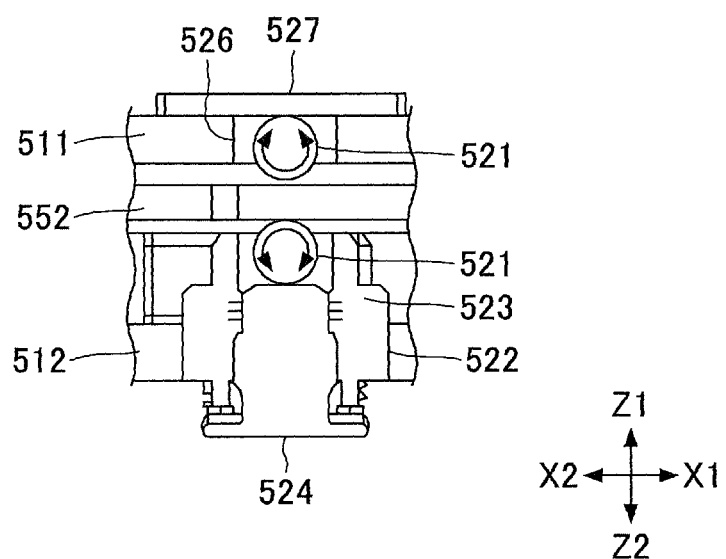
FIG. 9 is a diagram illustrating a structure of supporting a movable plate by the fixed unit according to the embodiment.

As illustrated in FIG. 8 and FIG. 9, the fixed unit 51 includes the top plate 511 and the base plate 512.

For example, the top plate 511 and the base plate 512 are flat-shaped plate members constituted with magnetic material such as iron or stainless steel. The top plate 511 and the base plate 512 are supported by a plurality of columnar supports 515 so that the top plate 511 and the base plate 512 are held in parallel via the predetermined gap.

The top plate 511 has a central hole 514 formed on a position facing the DMD 551 of the movable unit 55. Further, the base plate 512 has a heat-transfer hole 519 formed on a position facing the DMD 551. A heat-transfer part of the heat sink 554 is inserted into the heat-transfer hole 519.

An upper end portion of each of the columnar supports 515 is inserted into a corresponding one of support holes 516, which are formed on the top plate 511. A lower end portion of each of the columnar supports 515 is inserted into a corresponding one of support holes 517, which are formed on the base plate 512. The columnar supports 515 support the top plate 511 and the base plate 512 in parallel so as to form the constant distance (gap) between the top plate 511 and the base plate 512.

The top plate 511 has screw holes 518 provided at four locations around the central hole 514. According to the embodiment, the two screw holes 518 are formed so as to be in communication with the central hole 514. The top plate 511 is fixed to the bottom part of the lighting optical system unit 40 with the screws 520 (illustrated in FIG. 6) that are inserted into the respective screw holes 518.

The top plate 511 has a plurality of support holes 526 for rotatably holding support balls 521 that support, from the upper side, the movable plate 552 so that the movable plate 552 is movable. Further, the base plate 512 has a plurality of support holes 522 for rotatably holding support balls 521 that support, from the lower side, the movable plate 552 so that the movable plate 552 is movable.

Upper ends of the respective support holes 526 of the top plate 511 are closed by lid members 527, and the support holes 526 of the top plate 511 hold the support balls 521 rotatably. Cylindrical holding members 523, each of which has an internal thread groove formed on an inner peripheral surface of the holding member 523, are inserted in the support holes 522 of the base plate 512. Lower end sides of the holding members 523 are closed (covered) by the positioning screws 524. The holding members 523 hold the support balls 521 so that the support balls 521 are rotatable.

The support balls 521, which are rotatably held at the top plate 511 and the base plate 512, are respectively in contact with the movable plate 552. Hence, the support balls 521 movably support the movable plate 552 from the both surfaces of the movable plate 552.

FIG. 9 is a diagram illustrating a structure of supporting the movable plate 552 by the fixed unit 51 according to the embodiment.

As illustrated in FIG. 9, at the top plate 511, the support balls 521 are rotatably held at the support holes 526 of which the upper end sides are closed by the lid members 527. At the base plate 512, the support balls 521 are rotatably held by the holding members 523, which are inserted in the support holes 522.

Each of the support balls 521 is held so that at least part of the support ball 521 protrudes from the support hole 522 or the support hole 526. Each of the support balls 521 is in contact with the movable plate 552 provided between the top plate 511 and the base plate 512. The top surface and the bottom surface of the movable plate 552 are supported by the plurality of rotatable support balls 521 so that the movable plate 552 is movable in a direction parallel to the top and bottom surfaces of the movable plate 552.

Moreover, the amount of protrusion of the support ball 521, which is provided on the base plate 512 side, from the upper end of the holding member 523 is changed depending on a position of the positioning screw 524. For example, if the positioning screw 524 is displaced in the Z1 direction (upward), the amount of protrusion of the support ball 521 is increased and the distance (gap) between the base plate 512 and the movable plate 552 is increased. On the other hand, if the positioning screw 524 is displaced in the Z2 direction (downward), the amount of protrusion of the support ball 521 is decreased and the gap between the base plate 512 and the movable plate 552 is decreased.

In this way, the gap between the base plate 512 and the movable plate 552 may be appropriately adjusted by changing the amount of protrusion of the support ball 521 by use of the positioning screw 524.

As illustrated in FIG. 8, a plurality of position detecting magnets 541 are provided on the top surface of the base plate 512. Each of the position detecting magnets 541 is constituted with two permanent magnets each having a rectangular parallelepiped shape. The two permanent magnets are arranged in parallel to each other in the longitudinal direction. Each of the position detecting magnets 541 forms a magnetic field, which reaches (affects) the DMD base plate 553 provided between the top plate 511 and the base plate 512.

Hall elements, each of which is provided on the bottom surface of the DMD base plate 553, and the position detecting magnets 541 constitute a position detecting unit that detects a position of the DMD 551.

Further, a plurality of driving magnets 531a, 531b, and 531c are provided on the bottom surface of the base plate 512. Note that the driving magnet 531c is not illustrated in FIG. 8. In the following descriptions, the driving magnets 531a, 531b, and 531c may be referred to as the "driving magnet(s) 531" as appropriate.

Each of the driving magnets 531 is constituted with two magnets each having a rectangular parallelepiped shape. The two magnets are arranged in parallel in the longitudinal. Each of the driving magnets 531 forms a magnetic field, which reaches (affects) the heat sink 554. Driving coils, provided on the top surface of the heat sink 554, and the driving magnets 531 constitute a driving unit that moves the movable unit 55.

Note that the number, positions, and the like of the support balls 521 and the columnar supports 515, which are provided on the fixed unit 51, are not limited to the configuration described in the embodiment.

(Movable Unit 55)

Figure 10:
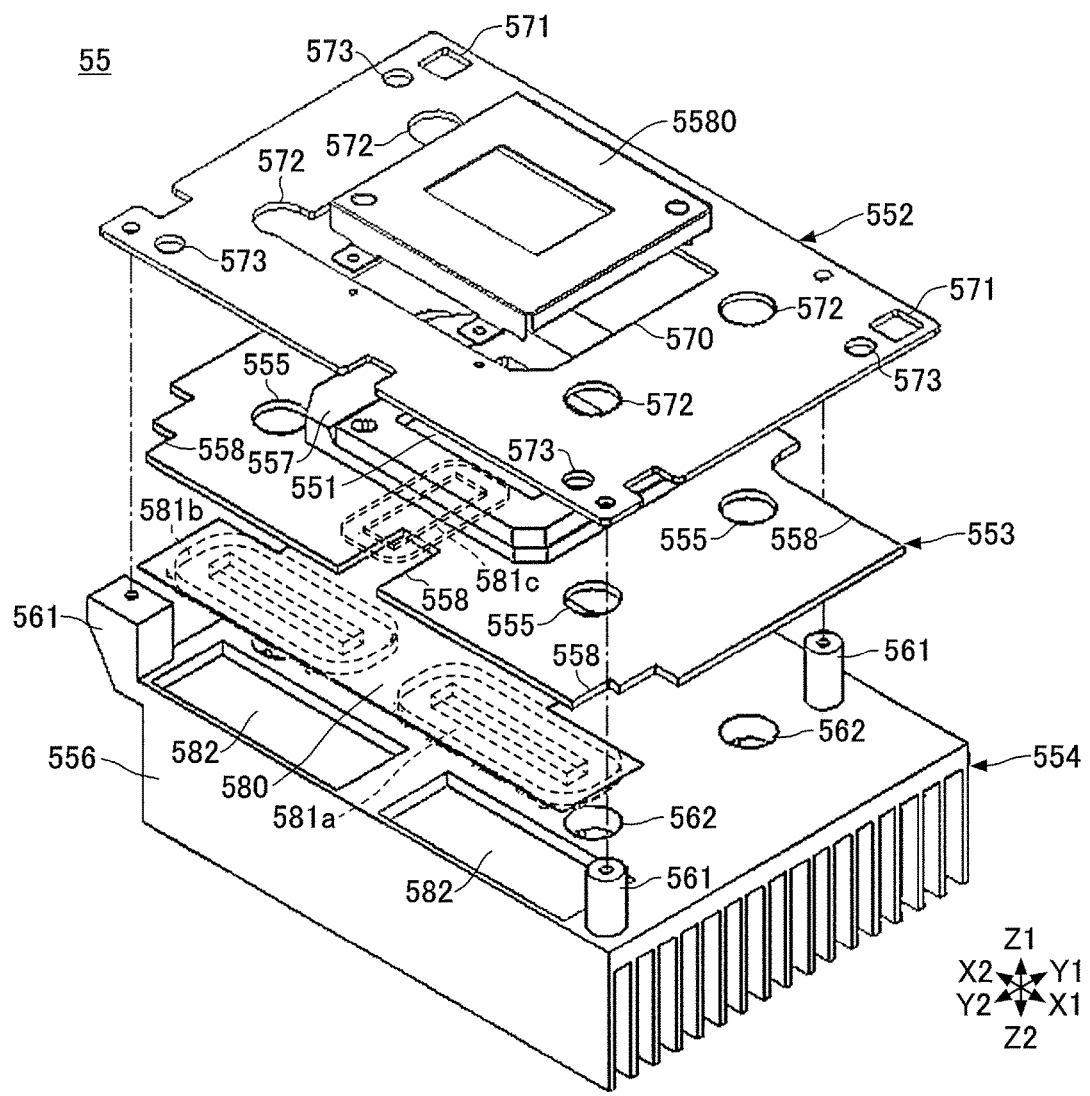
FIG. 10 is an exploded perspective view of a movable unit according to the embodiment.
Figure 11:
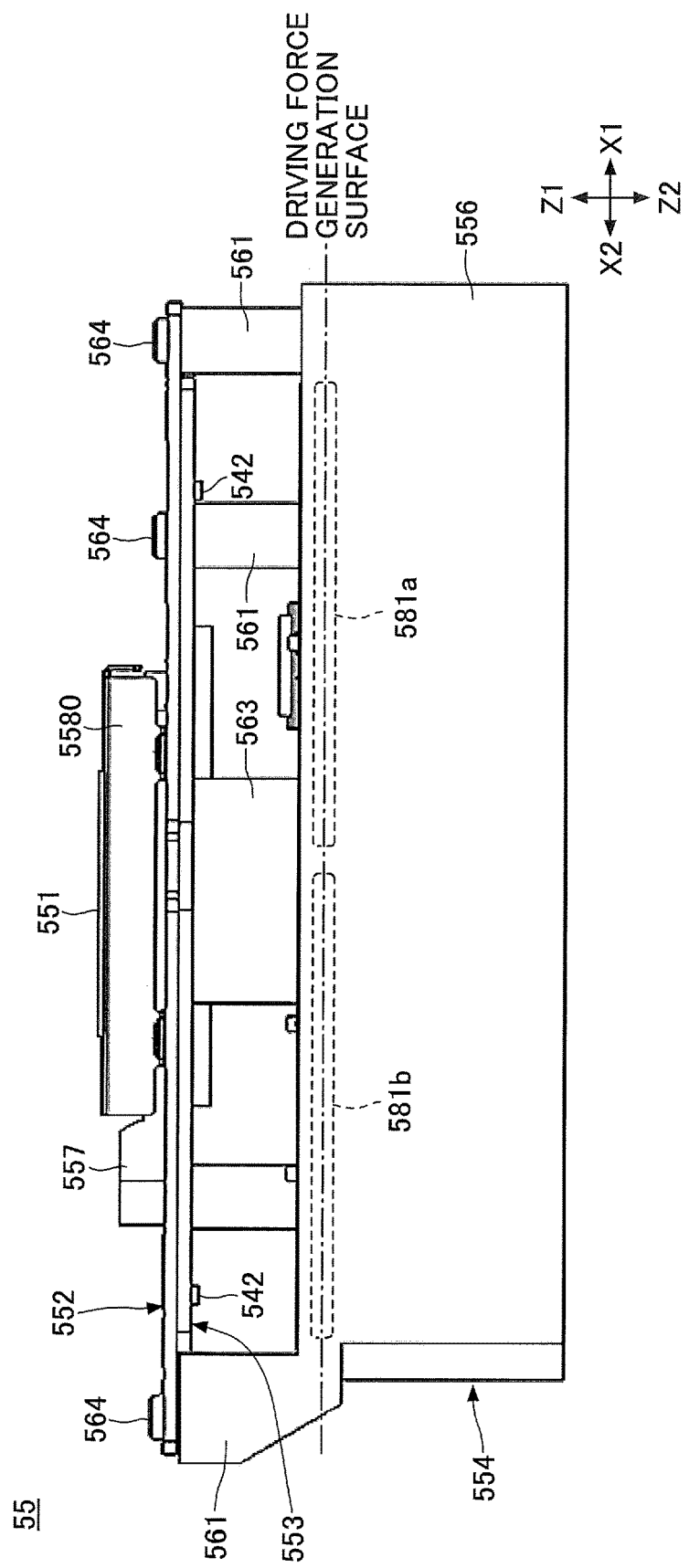
FIG. 11 is a side view of the movable unit according to the embodiment.

FIG. 10 is an exploded perspective view of the movable unit 55 according to the embodiment. FIG. 11 is a side view of the movable unit 55 according to the embodiment.

As illustrated in FIG. 10 and FIG. 11, the movable unit 55 includes the DMD 551, the movable plate 552, the DMD base plate 553, and the heat sink 554.

As described above, the movable plate 552 is provided between the top plate 511 and the base plate 512 of the fixed unit 51, and supported by the plurality of support balls 521 to be movable in the direction parallel to the top and bottom surfaces of the movable plate 552.

As illustrated in FIG. 10, the movable plate 552 has a central hole 570 at a position facing the DMD 551, which is mounted on the DMD base plate 553. Further, the movable plate 552 has through holes 572, into which the screws 520, which fix the top plate 511 to the lighting optical system unit 40, are inserted. Further, the movable plate 552 has coupling holes 573, which are used for coupling to the DMD base plate 553, and movable range restriction holes 571 at positions corresponding to the columnar supports 515 of the fixed unit 51.

For example, in a state in which the gap is adjusted to make the surface of the movable plate 552 and the image generation surface of the DMD 551 be parallel by the screws that are inserted into the respective coupling holes 573, the movable plate 552 and the DMD base plate 553 are coupled and fixed by an adhesive agent.

Here, the movable plate 552 moves in parallel to the surface, and the DMD 551 moves together with the movable plate 552 as well. Accordingly, if the surface of the movable plate 552 and the image generation surface of the DMD 551 are not parallel, there is a possibility that the image generation surface of the DMD 551 inclines with respect to the moving direction and the image is disturbed (disordered).

Thus, according to the embodiment, the screws are inserted into the coupling holes 573 to adjust the gap between the movable plate 552 and the DMD base plate 553, and the surface of the movable plate 552 and the image generation surface of the DMD 551 are held in parallel. Thereby, it is possible to prevent the image quality from decreasing.

The columnar supports 515 of the fixed unit are inserted in the movable range restriction holes 571. For example, if the movable plate 552 is greatly displaced (moved) due to vibration or certain malfunction, the columnar supports 515 come in contact with the movable range restriction holes 571 to restrict the movable range of the movable plate 552.

Note that the number, the positions, and the shapes, and the like of the movable range restriction holes 571 and the coupling holes 573 are not limited to the configuration described in the embodiment. A configuration, which is different from that of the embodiment, may be used to couple the movable plate 552 and the DMD base plate 553.

The DMD base plate 553 is provided between the top plate 511 and the base plate 512 of the fixed unit 51, and coupled to the bottom surface of the movable plate 552 as described above.

The DMD 551 is provided on the top surface of the DMD base plate 553. The DMD 551 is coupled to the DMD base plate 553 via a socket 557. A cover 5580 covers around the DMD 551. The DMD 551 is exposed to the top surface side of the movable plate 552 through the central hole 570 of the movable plate 552. In other words, the DMD 551 may protrude thorough the central hole 570.

The DMD base plate 553 has through holes 555 into which the screws 520, which fix the top plate 511 to the lighting optical system unit 40, are inserted. Further, the DMD base plate 553 has cutouts 558 at portions facing coupling columns 561 of the heat sink 554 so that the movable plate 552 is fixed to the coupling columns 561 of the heat sink 554.

For example, if the movable plate 552 and the DMD base plate 553 are jointly fastened to the coupling columns 561 of the heat sink 554, there is a possibility that the DMD base plate 553 is distorted, the image generation surface of the DMD 551 inclines with respect to the moving direction, and the image is disturbed. Thus, the cutouts 558 are formed on outer edge portions of the DMD base plate 553 so that the coupling columns 561 of the heat sink 554 are coupled to the movable plate 552 avoiding the DMD base plate 553.

Because the heat sink 554 is coupled to the movable plate 552 according to the above described configuration, the possibility that the DMD base plate 553 is distorted due to receiving a load from the heat sink 554 is reduced. Accordingly, it is possible to hold the image generation surface of the DMD 551 in parallel to the moving direction and to maintain the image quality.

Further, the cutouts 558 of the DMD base plate 553 are formed to include portions facing the support holes 522 of the base plate 512 so that the support balls 521, held by the base plate 512, contact the movable plate 552 while avoiding the DMD base plate 553. According to such a configuration, at the DMD base plate 553, it is possible to prevent occurrence of distortion due to the load from the support balls 521 and to hold the image generation surface of the DMD 551 in parallel to the moving direction to maintain the image quality.

Note that the shapes of the cutouts 558 are not limited to the shapes described in the embodiment. Through holes may be formed on the DMD base plate 553 instead of the cutouts 558 if it is possible to make the DMD base plate 553 be in non-contact with the coupling columns 561 of the heat sink 554 and the support balls 521. In other words, the DMD base plate 553 may have at least one cutout or at least one hole, and at least one coupling member, which couples the heat radiating part 556 to the movable plate 552 through the at least one cutout or at least one hole in a state in which the DMD base plate 553 is not in contact with the at least one coupling member.

As illustrated in FIG. 11, on the bottom surface of the DMD base plate 553, the hall elements 542 as magnetic sensors are provided at positions facing the position detecting magnets 541 provided on the top surface of the base plate 512. The hall elements 542, provided at the DMD base plate 553, and the position detecting magnets 541, provided at the base plate 512, constitute a position detecting unit that detects a position of the DMD 551.

As illustrated in FIG. 10 and FIG. 11, the heat sink 554 includes a heat radiating part 556, the coupling columns 561, and a heat-transfer part 563. The heat-transfer part 563 is not illustrated in FIG. 10.

The heat radiating part 556 is coupled to the DMD base plate 553. The base plate 512 is provided (sandwiched) between the heat radiating part 556 and the DMD base plate 553. A plurality of fins are formed on the lower portion of the heat radiating part 556. The heat radiating part 556 radiates (dissipates) heat generated in the DMD 551. As illustrated in FIG. 10, concave portions 582 are formed on the top surface of the heat radiating part 556. Driving coils 581a, 581b, and 581c, which are provided on a flexible base plate 580, are attached to the concave portions 582. In the following description, the driving coils 581a, 581b, and 581c may be referred to as the "driving coil(s) 581" as appropriate.

The concave portions 582 are formed on positions facing the driving magnets 531 that are provided on the bottom surface of the base plate 512. The driving coils 581, which are attached to the concave portions 582, and the driving magnets 531, which are provided on the bottom surface of the base plate 512, constitute a driving unit that moves the movable unit 55 relative to the fixed unit 51.

Further, the heat radiating part 556 has through holes 562, into which the screws 520, which fix the top plate 511 to the lighting optical system unit 40, are inserted.

The coupling columns 561 are formed on three locations to extend from the top surface of the heat radiating part 556 in the Z1 direction. The movable plate 552 is fixed to respective upper ends of the coupling columns 561 with screws 564 (illustrated in FIG. 11). The coupling columns 561 are coupled to the movable plate 552 without contacting the DMD base plate 553 because of the cutouts 558 formed on the DMD base plate 553.

As illustrated in FIG. 11, the heat-transfer part 563 extends from the top surface of the heat radiating part 556 in the Z1 direction and is in contact with the bottom surface of the DMD 551 to transfer, to the heat radiating part 556, heat generated in the DMD 551. For example, a heat-transfer sheet may be provided between the DMD 551 and the upper end surface of the heat-transfer part 563 in order to enhance heat conductivity. In such a case, the thermal conductivity between the heat-transfer part 563 of the heat sink 554 and the DMD 551 is enhanced by the heat-transfer sheet, and thereby the effect of cooling the DMD 551 is enhanced.

The through holes 572 of the movable plate 552, the through holes 555 of the DMD base plate 553, and the through holes 562 of the heat sink 554 are formed to face each other in the Z1-Z2 direction. The screws 520, which fix the top plate 511 to the lighting optical system unit 40, are inserted into the through holes 562, the through holes 555, and the through holes 572, from the lower side. In other words, the through holes 562, the through holes 555, and the through holes 572 may be respectively overlapped in the Z1-Z2 direction.

Here, a space corresponding to the thickness of the DMD 551 and the socket 557 is generated between from the surface of the DMD base plate 553 to the image generation surface of the DMD 551. If the DMD base plate 553 is arranged above the top plate 511, the space from the surface of the DMD base plate 553 to the image generation surface of the DMD 551 becomes a dead space and there is a possibility that the apparatus configuration grows in size.

According to the embodiment, the DMD base plate 553 is provided between the top plate 511 and the base plate 512 to arrange the top plate 511 in the space from the surface of the DMD base plate 553 to the image generation surface of the DMD 551. According to such a configuration, it is possible to effectively utilize the space from the surface of the DMD base plate 553 to the image generation surface of the DMD 551 to reduce the height in the Z1-Z2 direction and to downsize the apparatus configuration. Thus, the image generating unit 50 according to the embodiment can be installed not only in a large projector but also in a small projector. That is, the versatility of the image generating unit 50 according to the embodiment can be enhanced.

(Driving Unit)

Figure 12:
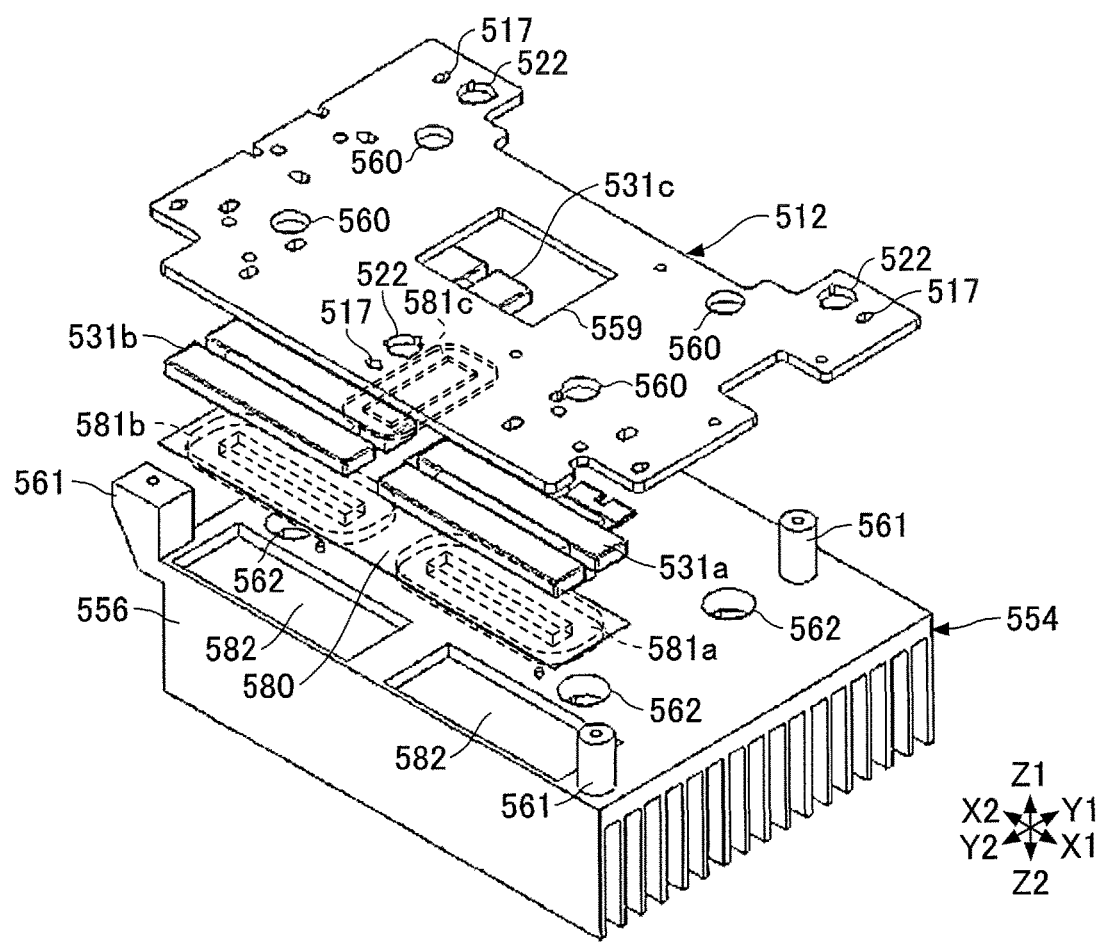
FIG. 12 is an exploded perspective view of an example of a configuration including a driving unit according to the embodiment.

FIG. 12 is an exploded perspective view of the driving unit according to the embodiment.

The driving unit according to the embodiment includes the driving magnets 531, provided on the base plate 512, and the driving coils 581, provided on the heat sink 554.

Each of the driving magnets 531a and 531b is constituted with two permanent magnets of which the longitudinal directions are parallel with the X1-X2 direction. The driving magnet 531c is constituted with two permanent magnets of which the longitudinal directions are parallel with the Y1-Y2 direction. Each of the driving magnets 531 forms a magnetic field, which reaches (affects) the heat sink 554.

Each of the driving coils 581 is formed of electric wire wound around an axis parallel to the Z1-Z2 direction, and is attached to the concave portion 582 formed on the top surface of the heat radiating part 556 of the heat sink 554.

In the state in which the movable unit 55 is supported by the fixed unit 51, the driving magnets 531 of the base plate 512 and the driving coils 581 of the heat sink 554 are provided to face each other, respectively. When electric current is caused to flow through the driving coils 581, Lorentz force to be driving force to move the movable unit 55 is generated by the magnetic fields formed by the driving magnets 531.

Receiving the Lorentz force as the driving force generated between the driving magnets 531 and the driving coils 581, the movable unit 55 is displaced to linearly move or rotate in the X-Y plane relative to the fixed unit 51.

According to the embodiment, as a first driving unit, the driving coil 581a and the driving magnet 531a, and the driving coil 581b and the driving magnet 531b are provided to face each other in the X1-X2 direction. When electric current flows through the driving coils 581a and 581b, the Lorentz force in the Y1 direction or the Y2 direction is generated.

The movable unit 55 is moved in the Y1 direction or the Y2 direction by the Lorentz force generated at the driving coils 581a and 581b. The movable unit 55 is rotated in the XY plane, by the Lorentz force generated in opposite directions at the driving coils 581a and 581b.

For example, when electric current is supplied so that the Lorentz force in the Y1 direction is generated at the driving coil 581a and the Lorentz force in the Y2 direction is generated at the driving coil 581b, the movable unit 55 rotates counterclockwise in a top view. On the other hand, when electric current is supplied so that the Lorentz force in the Y2 direction is generated at the driving coil 581a and the Lorentz force in the Y1 direction is generated at the driving coil 581b, the movable unit 55 rotates clockwise in a top view.

Further, according to the embodiment, the driving coil 581c and the driving magnet 531c are provided as a second driving unit. The driving magnet 531c is arranged so that the longitudinal direction of the driving magnet 531c is orthogonal to the longitudinal direction of the driving magnets 531a and 531b. In such a configuration, when electric current flows through the driving coil 581c, Lorentz force in the X1 direction or the X2 direction is generated. The movable unit 55 is moved in the X1 direction or the X2 direction by the Lorentz force generated at the driving coil 581c.

The magnitude and direction of the electric current flowing through each of the driving coils 581 are controlled by the drive control unit 12 of the system control unit 10. The drive control unit 12 controls (changes) the magnitude and direction of the electric current to be supplied to each of the driving coils 581 to control the direction of movement (or rotation), the amount of movement and the rotational angle of the movable plate 552.

The base plate 512 has a heat-transfer hole 559 provided on a position facing the DMD 551 provided on the DMD base plate 553. The heat-transfer part 563 of the heat sink 554 is inserted into the heat-transfer hole 559. Further, the base plate 512 has through holes 560, into which the screws 520, which fix the top plate 511 to the lighting optical system unit 40, are inserted.

Here, in the movable plate 55 according to the embodiment, a weight of the heat sink 554 is heavier than a weight including the DMD base plate 553 and the movable plate 552. Thus, a position of a center of gravity of the movable unit 55 in the Z1-Z2 direction is located close to the heat radiating part 556 of the heat sink 554.

In such a configuration, for example, when the driving coils 581 are provided on the movable plate 552 to cause Lorentz force as driving force to act on the movable plate 552, the position of the center of gravity of the movable unit 55 and a driving force generation surface, at which the driving coils 581 are located, are away from each other in the Z1-Z2 direction. Similarly, when the driving coils 581 are provided on the DMD base plate 553, the position of the center of gravity of the movable unit 55 and the driving force generation surface, at which the driving coils 581 are located, are away from each other in the Z1-Z2 direction.

In the configuration, in which the center of gravity of the movable unit 55 is away from the driving force generation surface, there is a possibility that the movable unit 55 swings like a pendulum where the position of the center of gravity is a support point and the driving force generation surface is a point of action in the Z1-Z2 direction. Because the acting moment increases as a distance between the support point and the point of action increases, vibration increases as the amount of deviation between the position of the center of gravity of the movable unit 55 and the driving force generation surface increases in the Z1-Z2 direction, and it becomes difficult to control the position of the DMD 551.

Further, when the movable unit 55 swings like a pendulum, a load on the movable plate 552, the top plate 511, and the base plate 512, which support the movable plate 552, is increased, and there is a possibility that each plate gets distorted or broken and the image is disturbed.

Thus, according to the embodiment, the driving coils 581 are provided on the concave portions 582 of the heat sink 554 so that the driving force generation surface is located at the heat radiating part 556 of the heat sink 554 as illustrated in FIG. 11. According to such a configuration, a distance (gap) between the center of gravity of the movable unit 55 and the driving force generation surface in the Z1-Z2 direction is decreased to the extent possible.

Therefore, the movable unit 55 according to the embodiment does not swing like a pendulum, and the moving direction(s) of the entire unit is held in the direction(s) parallel with the X-Y plane. Thus, without occurrence of problems such as distortion and breakage as described above, it becomes possible to enhance the operating stability of the movable unit and to control the position of the DMD 551 with high accuracy. According to an embodiment, similar effects can be obtained when the driving magnets 531a, 531b, and 531c are provided on the base plate 512 side of the heat sink 554 and the driving coils 581a, 581b, and 581c are provided on the heat sink 554 side of the base plate 512. In other words, the driving coils 581 may be provided on the bottom surface of the base plate 512 and the driving magnets 531 may be provided on the concave portions 582 of the heat sink 554. It should be noted that according to the embodiment, at least one driving coil 581 may be provided on one of the base plate (fixed member) 512 and the heat radiating part 556, and at least one driving magnet 531 may be provided on the other of the base plate 512 and the heat radiating part 556.

It is preferable that the position of the center of gravity of the movable unit 55 matches the driving force generation surface in the Z1-Z2 direction. For example, a depth (size) of the concave portions 582 to which the driving coils 581 are attached, a shape of the heat radiating part 556 of the heat sink 554, and/or the like may be appropriately changed to match the position of the center of gravity of the movable unit 55 and the driving force generation surface in the Z1-Z2 direction.

(Position Detecting Unit)

Figure 13:
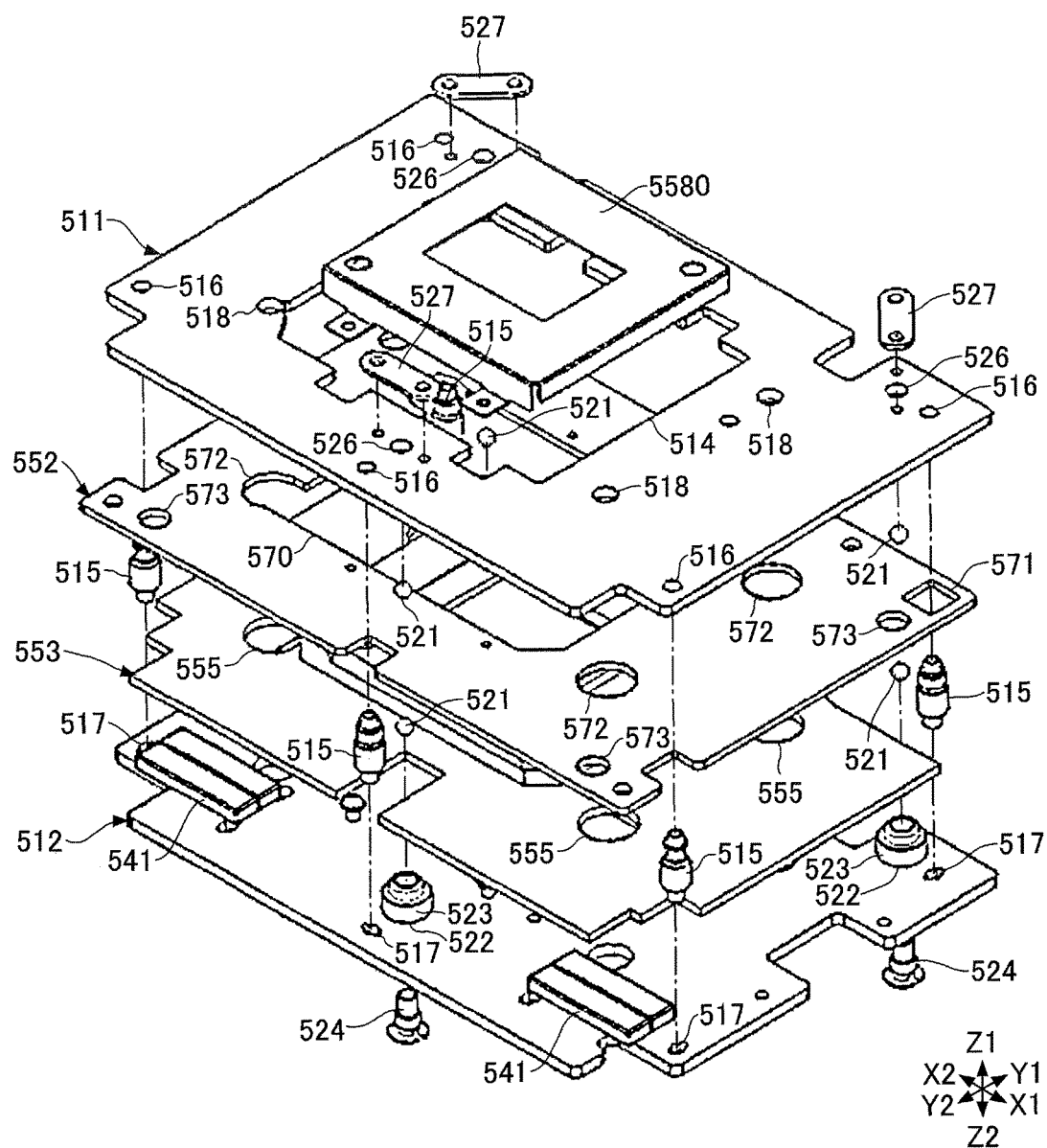
FIG. 13 is an exploded perspective view of an example of a configuration including a position detecting unit according to the embodiment.
Figure 14:
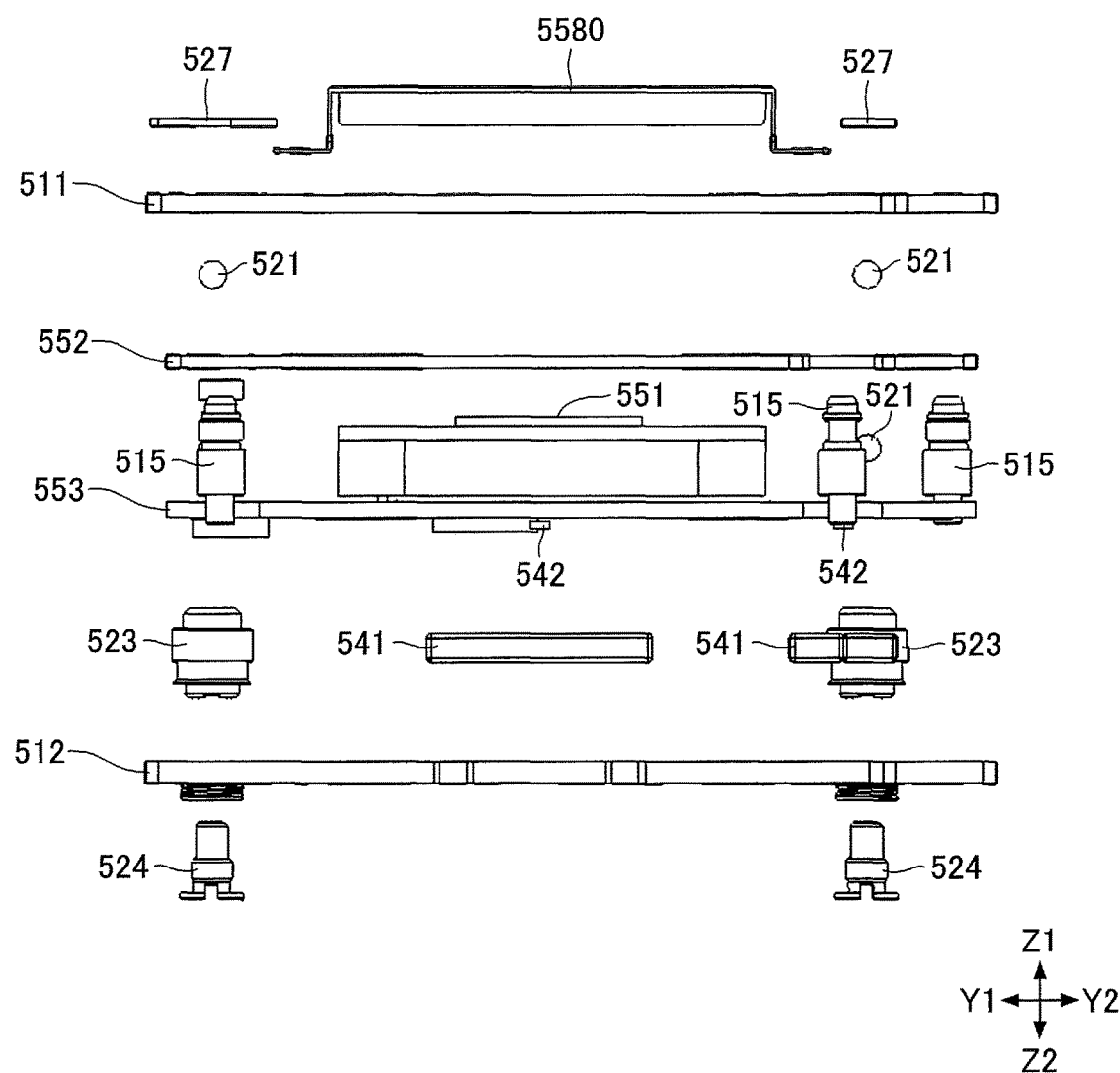
FIG. 14 is an exploded side view of the example of the configuration including the position detecting unit according to the embodiment.

FIG. 13 is an exploded perspective view of an example of a configuration including the position detecting unit according to the embodiment. FIG. 14 is an exploded side view of the example of the configuration including the position detecting unit according to the embodiment.

The position detecting unit according to the embodiment includes the position detecting magnets 541, provided on the base plate 512, and the hall elements 542, provided on the DMD base plate 553. The position detecting magnets 541 and the hall elements 542 are arranged to face each other in the Z1-Z2 direction. In other words, at least one position detecting magnet 541 and at least one hall element 541 may be arranged between the DMD base plate 553 and the base plate 512 or the top plate 511 to face each other.

Each of the hall elements 542 is an example of a magnetic sensor. The hall element 542 transmits, to the drive control unit 12 of the system control unit 10, a signal in accordance with a change of a magnetic flux density from the position detecting magnet 541 that is provided to face the hall element 541. The drive control unit 12 detects, based on the signals transmitted from the Hall elements 542, the position of the DMD 551 provided on the DMD base plate 553.

Here, according to the embodiment, the base plate 512 and the top plate 511 formed with magnetic material serve as yoke boards and constitute a magnetic circuit, which includes the position detecting magnets 541. Further, the magnetic flux generated at the driving unit, which is provided between the base plate 512 and the heat sink 554 and includes the driving magnets 531 and the driving coils 581, is concentrated in the base plate 512, which functions as the yoke board, and thus, the leakage to the position detecting unit is reduced.

Accordingly, influence of the magnetic fields generated by the driving unit including the driving magnets 531 and the driving coils 581 is reduced at the hall elements 542 provided on the bottom surface side of the DMD base plate 553. Therefore, the hall elements 542 can output signals in accordance with the change of the magnetic flux density of the position detection magnets 541 without being influenced by the magnetic fields generated at the driving unit. Thus, it is possible for the driving control unit 12 to detect (determine) the position of the DMD 551 with high accuracy.

In this way, the drive control unit 12 can detect the position of the DMD 551 with high accuracy based on the output of the hall elements 542 in which influence from the driving unit is reduced. Accordingly, the drive control unit 12 can control the magnitude and the direction of the electric current flowing through the driving coils 581 in accordance with the detected position of the DMD 551 and can control the position of the DMD 551 with high accuracy.

It should be noted that the configuration of the driving unit and the configuration of the position detecting unit are not limited to the configurations described in the embodiment. The number, positions, etc., of the driving magnets 531 and the driving coils 581 as the driving unit may be different from those described in the embodiment as long as the movable unit 55 can be moved to an arbitrary position. For example, the driving unit, which moves the movable unit 55 relative to the fixed unit 51, may include at least one driving magnet and at least one driving coil, which faces the at least one driving magnet. The at least one driving magnet and the at least one driving coil may be arranged between the base plate 512 and the heat radiating part 556. Further, the number, positions, etc., of the position detecting magnets 541 and the hall elements 542 as the position detecting unit may be different from those described in the embodiment as long as it is possible to detect the position of the DMD 551.

For example, the position detecting magnets 541 may be disposed on the top plate 511 and the hall elements 542 may be disposed on the movable plate 552. Further, for example, the position detecting unit may be disposed between the base plate 512 and the heat sink 554, and the driving unit may be disposed between the top plate 511 and the base plate 512. However, it is preferable to provide a yoke board between the driving unit and the position detecting unit in order to reduce influence of the magnetic fields from the driving unit to the position detecting unit. Further, it is preferable to provide the driving magnets 531 and the position detecting magnets 541 on the top plate 511 or the base plate 512 of the fixed unit 51, because, otherwise, there is a possibility that the weight of the movable unit 55 increases and it becomes difficult to control the position of the movable unit 55.

Further, the top plate 511 and the base plate 512 may be partially made of magnetic material as long as it is possible to reduce the leakage of the magnetic flux from the driving unit to the position detecting unit. For example, the top plate 511 and the base plate 512 may be formed by stacking multiple members including a flat-plate-shaped member or a sheet-shaped member made of magnetic material. The top plate 511 may be made of non-magnetic material as long as the base plate 512 is at least partially made of magnetic material and functions as a yoke board for preventing the leakage of the magnetic flux from the driving unit to the position detecting unit.

<Image Projection>

As described above, according to the projector 1 of the embodiment, the DMD 551, which generates a projection image, is mounted on the movable unit 55, and the position of the DMD 551 is controlled by the drive control unit 12 of the system control unit 10.

For example, the drive control unit 12 controls the position of the movable unit 55 in such a way that the movable unit 55 moves at high speed between a plurality of positions away from each other by less than an array interval of the micromirrors of the DMD 551 at a predetermined cycle corresponding to a frame rate when projecting an image. At this time, the image control unit 11 transmits an image signal to the DMD 551 to generate a projection image shifted according to each of the positions.

For example, the drive control unit 12 reciprocates the DMD 551 at a predetermined cycle between a position P1 and a position P2 away from each other in the X1-X2 direction and the Y1-Y2 direction by less than the array interval of the micromirrors of the DMD 551. At this time, the image control unit 11 controls the DMD 551 to generate the projection image shifted according to each of the positions so that it becomes possible to make the resolution of the projection image to be about double of the resolution of the DMD 551. Moreover, the number of moving positions of the DMD 551 may be increased to make the resolution of the projection image to be more than double of the resolution of the DMD 551. In other words, the drive control unit 12 may control the driving unit, which moves the movable unit 55 relative to the fixed unit 51, to move the movable unit 55 by a distance less than the array interval of the micromirrors. In other words, the drive control unit 12 may control the electric current, which flows through the driving coils 581, to move the movable unit 51.

In this way, the drive control unit 12 shifts (moves) the DMD 551 together with the movable unit 55, and the image control unit 11 controls the DMD 551 to generate the projection image according to the position of the DMD 551. Hence, it is possible to project the image whose resolution is made higher than or equal to the resolution of the DMD 551.

According to the projector 1 of the embodiment, the drive control unit 12 controls the DMD 551 so that the DMD 551 is rotated integrally with the movable unit 55. Thereby, it is possible to rotate the projection image without reducing the size of the projection image. For example, in a projector, in which an image generating part such as a DMD is fixed, it is impossible to rotate a projection image without shrinking the projection image while keeping the aspect ratio of the projection image. In contrast, according to the projector 1 of the embodiment, it is possible to rotate the DMD 551, and thus, it is possible to rotate the projection image to adjust the tilt without shrinking the projection image.

As described above, according to the image generating unit 50 of the embodiment, the DMD 551 is provided to be movable, and it is possible to shift (move) the DMD 551 to generate the image having high resolution.

Further, the embodiment is configured such that the driving force for moving the movable unit 55 acts on the heat sink 554 to decrease the gap between the position of the center of gravity of the movable unit 55 and the driving force generation surface in the Z1-Z2 direction. Thus, the movable unit 55 does not swing like a pendulum and the stability of the operation of the movable unit 55 is enhanced. Accordingly, it is possible to control the position of the DMD 551 with high accuracy.

Furthermore, according to the embodiment, the base plate 512 and the top plate 511, constituted with magnetic materials, serve as yoke boards and constitute a magnetic circuit with the position detecting magnets 541 of the position detecting unit, and influence of the magnetic fields, generated at the driving unit, on the position detecting unit is reduced. Thus, the drive control unit 12 can detect, with high accuracy, the position of the DMD 551 that shifts at high speed based on the output of the hall elements 542, and can control the position of the DMD 551 with high accuracy.

The image generating unit and the image projecting apparatus according to the present disclosure are not limited to the above described embodiment, but various variations and modifications may be made without departing from the scope of the present disclosure.

What is claimed is:

1. An image generating unit comprising:
   a fixed member on which one of a driving magnet and a coil is provided;
   a heat radiating part on which the other of the driving magnet and the coil is provided;
   an image generating part, to which the heat radiating part is attached, configured to receive illumination light to generate an image;
   a fixed unit including a first fixed plate and a second fixed plate;
   a first movable plate movably supported between the first fixed plate and the second fixed plate; and
   a second movable plate coupled to the first movable plate,
   wherein the image generating part is provided on the second movable plate,
   wherein the heat radiating part is coupled to the first movable plate, the second fixed plate being sandwiched between the heat radiating part and the first movable plate, and
   wherein the fixed member is the second fixed plate.

2. The image generating unit according to claim 1, further comprising:
   a position detecting unit including a position detecting magnet and a magnetic sensor that are arranged, between the second movable plate and the first fixed plate or the second fixed plate, to face each other, and
   wherein at least part of the second fixed plate is made of a magnetic material.

3. The image generating unit according to claim 2,
   wherein the second movable plate is provided between the first movable plate and the second fixed plate,
   wherein the magnetic sensor is provide on the second movable plate, and
   wherein the position detecting magnet is provided on the second fixed plate.

4. The image generating unit according to claim 1,
   wherein the coil is provided to face the driving magnet, and
   wherein the coil generates driving force of the heat radiating part when electric current is caused to flow through the coil.

5. The image generating unit according to claim 1, further comprising:
   a drive control unit configured to control electric current that flows through the coil,
   wherein the image generating part includes a digital micromirror device in which a plurality of micromirrors that modulate the illumination light based on an image signal are arrayed, and
   wherein the drive control unit controls the electric current, which flows through the coil, to move, at a predetermined cycle, the image generating part by a distance less than an array interval of the plurality of micromirrors.

6. An image projecting apparatus comprising:
   the image generating unit according to claim 1;
   a light source configured to emit the illumination light to the image generating part; and
   a projecting part configured to project the image generated by the image generating part.

7. An image generating unit comprising:
   a fixed member on which one of a driving magnet and a coil is provided;
   a heat radiating part on which the other of the driving magnet and the coil is provided;
   an image generating part, to which the heat radiating part is attached, configured to receive illumination light to generate an image; and
   a drive control unit configured to control electric current that flows through the coil,
   wherein the image generating part includes a digital micromirror device in which a plurality of micromirrors that modulate the illumination light based on an image signal are arrayed, and wherein the drive control unit controls the electric current, which flows through the coil, to move, at a predetermined cycle, the image generating part by a distance less than an array interval of the plurality of micromirrors.

* * * * *